Jan. 9, 1968 M. B. GARDNER 3,363,061

AUTOMATIC EQUALIZATION OF NOISE LEVELS IN CONFERENCE TELEPHONY

Filed Nov. 12, 1964 2 Sheets-Sheet 1

INVENTOR
M. B. GARDNER
BY C. E. Hirsch Jr.
ATTORNEY

United States Patent Office 3,363,061

Patented Jan. 9, 1968

3,363,061

AUTOMATIC EQUALIZATION OF NOISE LEVELS IN CONFERENCE TELEPHONY

Mark B. Gardner, Chatham Township, Morris County, N.J., assignor to Bell Telephone Laboratories, Incorporated, New York, N.Y., a corporation of New York Filed Nov. 12, 1964, Ser. No. 410,409
10 Claims. (Cl. 179—1)

ABSTRACT OF THE DISCLOSURE

To overcome difficulties created by a difference in ambient noise levels between stations on a conference call network, the levels of ambient noise are sensed, compared, and used to generate a control signal in response to which a noise generator raises the noise level of the quieter location to that of the noisier.

Figure 1:
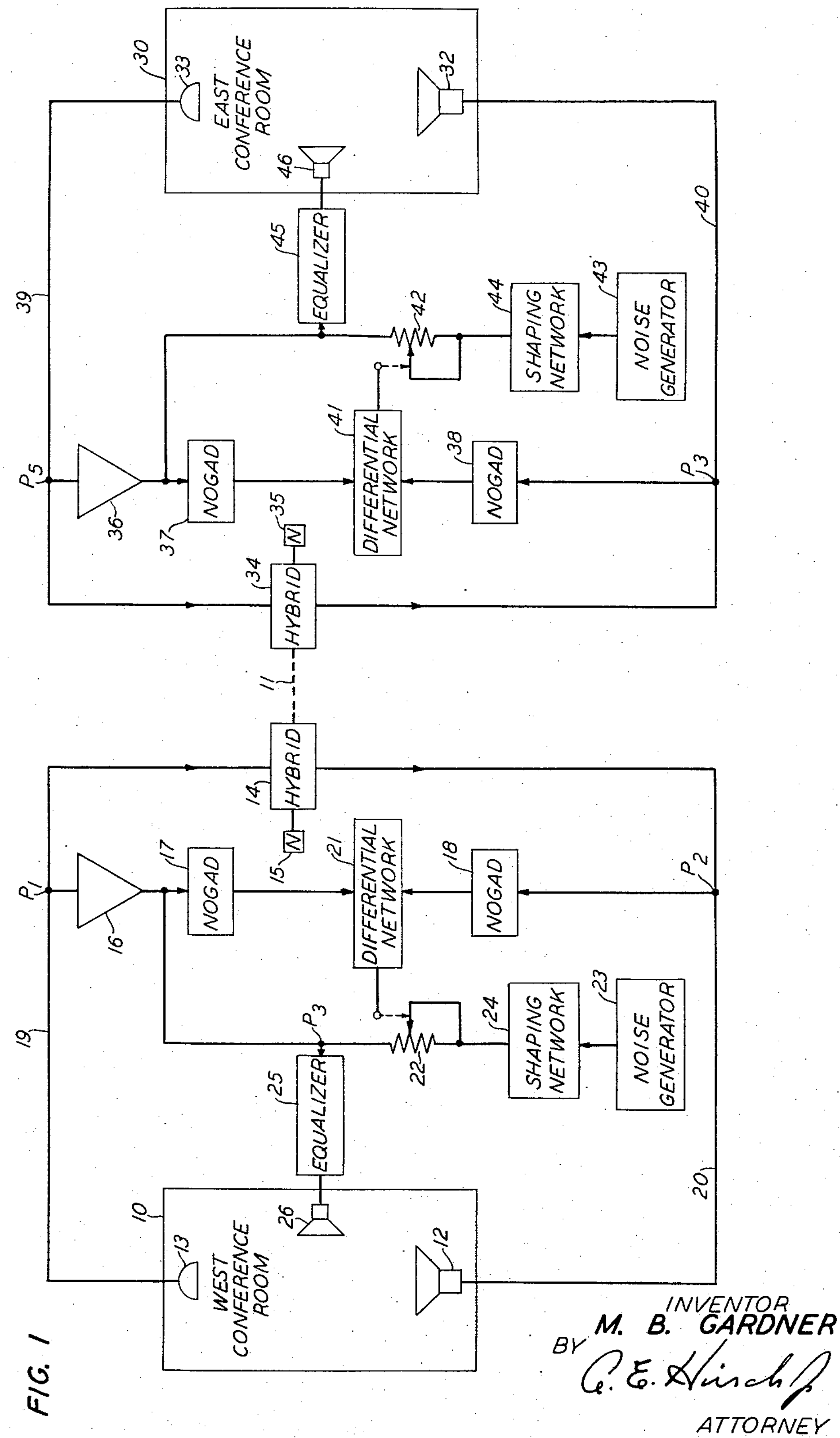

This invention relates to telephone circuits and more particularly to conference systems which employ separate transmitting and receiver circuits at each terminal in order that a group of people at one location may maintain two-way communication with a group at a remote location by telephone circuits extending between the two locations.

A so-called conference telephone system which includes a microphone and a loudspeaker telephone receiver at each conference location enables communication to be carried on between persons located at widely separated points with a facility approaching that obtainable when they are gathered together in conference at a single location. It is of course desirable that the telephone circuits interconnecting the two locations establish conditions at each location which approximate the conditions existing when talkers at both locations are in the same room. The conversation should flow without interruption and speech levels should be such that those present in the conference room at either location may hear both local talkers and those at the distant conference room equally well.

If each conference location has a low ambient noise level, gains in the interconnecting telephone circuits may be set to approximate the desired condition. However, if one conference room has an ambient noise level higher than that of the other, a participant at a noisy location will talk more uniformly with time and at a higher level in order to be heard locally than will one at a quiet location. As a result, levels at the distant, quiet, conference room may be too loud. On the other hand, talkers in the quiet conference room speak at a less uniform and correspondingly lower level, sufficient only to reach those in the quiet conference room. This level may be insufficient to produce an adequate listening level at the distant, noisy, conference location. The net result is that outgoing levels from the two locations tend to be just the reverse of those actually most needed. If the noise levels at each location can be predicted and are constant, the gain in the two one-way circuits may of course be adjusted individually to provide the necessary increase in gain at the noisy location. If the noise level fluctuates from time to time at either or both of the conference locations, however, either excessively loud signals are received during periods of low ambient noise, or insufficient levels are developed at the noisier location during periods of low ambient noise at the quiter location.

These difficulties are overcome in the present invention by continuously adjusting the noise level automatically at the quieter location to match the noise level at the noisier location. Thus by creating comparable environments, the present invention provides participants in a telephone conference with a guide for predicting the acceptability of vocal performance at the far end of the line by the ability to observe its acceptability under similar local conditions. In addition, noise levels are equalized automatically in the presence of line or voice switching fluctuations. As a result, variations in the noise level due to such fluctuations are masked, i.e., smoothed over, by reciprocally adjusting the noise level at the quieter location.

It is thus a principal object of the invention to improve the operation of two-way telephone conference systems in order to assure a free flow of conversation in both directions.

It is another object of the invention to maintain a relatively constant noise level at each location of a conference telephone system, and to maintain the pre-established noise level despite fluctuations in line or ambient noise conditions both in the presence or absence of voice switching.

Environmental control of conference locations is achieved by continuously examining outgoing and incoming signal levels at each conference location to establish a reference noise level deemed to be acceptable for that location in terms of the noise level at the other station. If the established reference level is higher than the ambient level of the conference location, locally generated noise signals are added to the quieter conference location. An additional background of artificial noise encourages a talker to increase the level and uniformity of his vocal output. Thus a controlled amount of added noise does not noticeably impair local conversation. Furthermore, it has been found that an individual readily adjusts to a moderate degree of steady background noise and tends to become more or less oblivious to its presence. The increase in vocal output induced by the noise approximately offsets the need for an increase in gain of the system to make the conversation acceptable at the noisy location. A cumulative buildup of noise between the two stations is avoided, according to the invention, by offsetting the locally added noise by the noise signal received from the distant station. It has been found that a suitably shaped random noise signal radiated in the conference room is satisfactory. Although it is most usual for the noise level at an exceptionally quiet location to be adjusted to match the level at an ordinary location, the apparatus of the inveniton may, of course, be adjusted to equalize any combination of levels.

Figure 2:
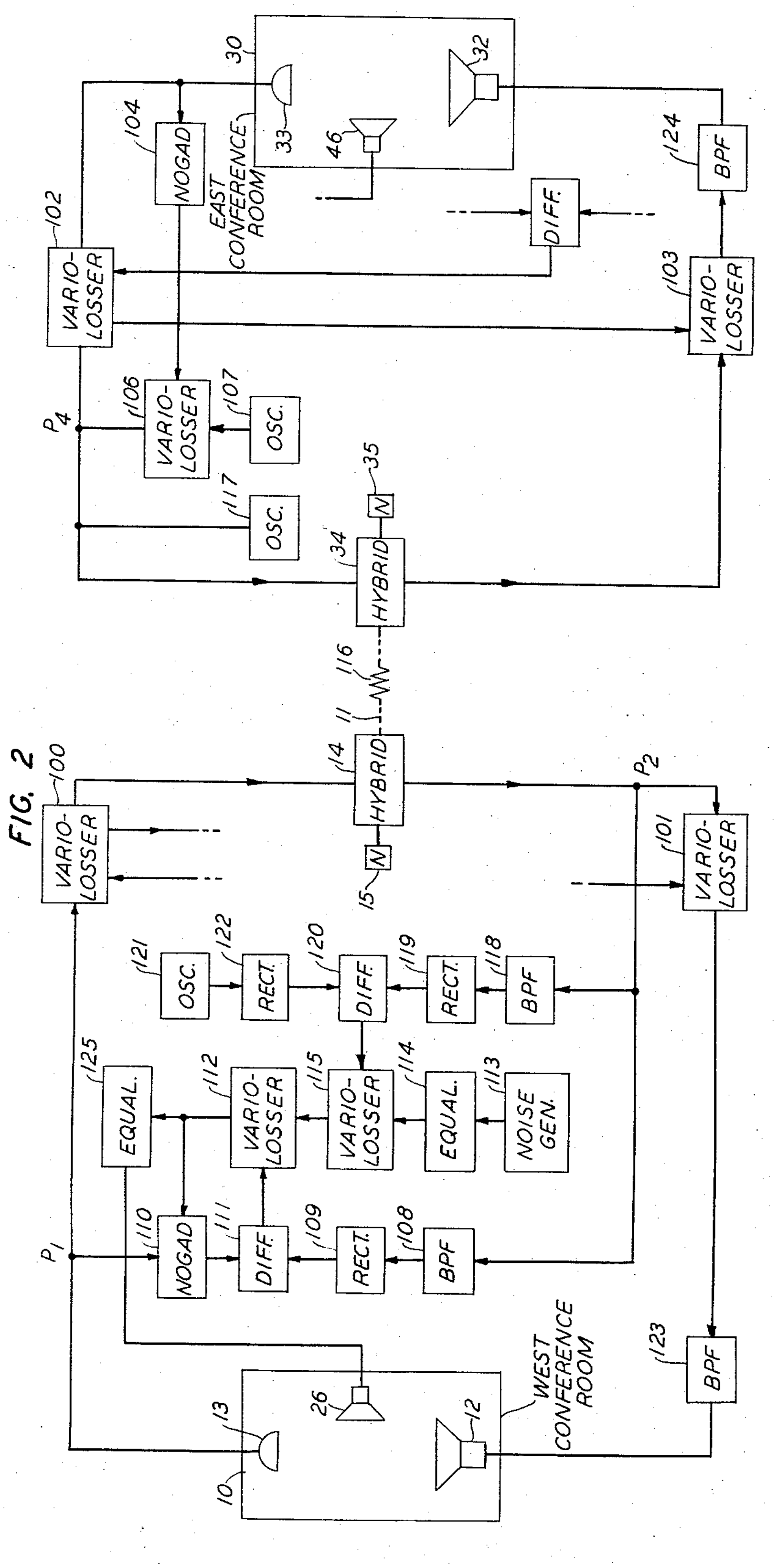

The invention will be fully apprehended from the following detailed description of an illustrative embodiment thereof taken in connection with the appended drawings in which:

FIG. 1 is a block schematic diagram of a simplified two-way conference telephone system which employs the automatic equalization of the present invention; and FIG. 2 is a block schematic diagram of a preferred system which employs the principles of the invention in a more generalized circuit configuration.

It is assumed in the simplified circuit of FIG. 1 that there is negligible line loss between the two conference locations designated, respectively, West conference room 10 and East conference room 30. It is further assumed that it is possible to achieve adequate received levels, for similar noise conditions, at both locations without voice switching. In practice, a loudspeaker or loudspeaker array (represented by the single loudspeaker 12 at West room 10, and 32 at East room 30) are employed for voice reception from the opposite terminal. A microphone (or microphones) at each location (13 at room 10 and 33 at room 30) direct signals from each conference room by way of the associated telephone circuits to the other location.

For purposes of illustration, assume that the noise level at West conference room 10 is low while that at East room 30 is somewhat higher. Under these conditions, signals produced by microphone 13 at station 10, in addition to being transmitted by way of hybrid circuit 14 to circuit 11, will be passed through amplifier 16 and delivered to Nogad (noise operated gain adjusting device) 17. The Nogad circuit recognizes the difference between the speech and the noise signals in circuit 19 at point $P_1$ and delivers a direct current signal, proportional to the level of the noise signal alone, to difference network 21. Under the conditions stipulated above, viz low noise level in room 10 and high noise level in room 30, the D-C output of Nogad 17 supplied to network 21 will be less than the corresponding output of Nogad 18, connected in the incoming circuit 20 at point $P_2$ regardless of the magnitudes of the respective speech signals at points $P_1$ and $P_2$. Difference network 21, therefore, produces an output signal proportional to the difference in the noise level of signals at points $P_1$ and $P_2$. The difference signal is employed to reduce the attenuation of variable impedance 22, typically a variolosser network, whenever the noise level at $P_2$ is higher than that at $P_1$. Such a reduction in attenuation permits random noise signals from generator 23 to be supplied by way of shaping network 24 to equalizer 25 and the input of auxiliary loudspeaker 26 in room 10. The noise level in conference room 10 is thus raised by the amount necessary to equalize the ambient noise levels of the two conference locations.

Nogad circuits 17 and 18, and indeed the other Nogad circuits employed in the systems of FIGS. 1 and 2, preferably are of the sort described in U.S. Patent 1,814,018 of S. B. Wright and D. Mitchell. They may, of course, be of any other desired construction, one entirely suitable form of which is described and illustrated in an article by W. F. Clemency and W. D. Goodale, Jr., which appears in the May 1961 issue of the Bell System Technical Journal beginning at page 649. Nogad circuits are virtually insensitive to voice frequency signals because of a slow build-up, quick-release characteristic, but respond to steady noise. By means of a rectifier or the like they develop a D-C potential proportional to the noise level of applied signals. The rectifiers in associated pairs of Nogads, e.g., 17 and 18, may be poled oppositely in order to simplify the construction of the difference network.

Network 24, connected in the output of noise generator 23, is used to shape the noise signal to obtain the desired spectral characteristic, i.e., one which best simulates normal room noise. Since the spectral distribution of ordinary room noise rises considerably as a function of decreasing frequency, network 24 is adjusted to provide considerable low frequency emphasis. The enhanced low frequency signals may then also be used to balance difference circuit 21 against the noise signal reaching point $P_2$ from East station 30. This is done by supplying the shaped noise signal developed at point $P_3$ to the input of Nogad 17. Obtaining a balance of the difference circuit in this way does not hinder the production of a desired level of noise in loudspeaker 26 but does avoid a controlling level of low frequency energy from being fed back to the East station by way of microphone 13. The very low frequency energy used for balance, i.e., that in excess of the low frequency noise required for simulating room noise, is removed by way of equalizer 25 before the noise signal is delivered to loudspeaker 26. In essence, then, network 24 shapes the noise signal issued by generator 23 to have low frequency components useful both for room noise simulation and for noise balance, and equalizer 25 further shapes the noise signal to eliminate the balance frequency noise. It may be that the low frequency roll-off of loudspeaker 26 is sufficient to eliminate the excess low frequency energy without need for equalizer 25. Further, in some applications, the noise signals available at point $P_3$ may be supplied by way of a suitable combining network directly to the input of primary loudspeaker 12 thus eliminating the need for the additional loudspeaker 26. The dual purpose loudspeaker arrangement shown is, however, more versatile and somewhat easier of adjustment.

The East conference station is equipped with apparatus identical to that just described for the West station. Incoming signals are continuously monitored and the difference between the noise levels at point $P_4$ in outgoing circuit 39 and ponit $P_5$ in incoming circuit 40, if any, is employed to adjust the attenuation of variable impedance 42 in order to control the level of noise delivered to loudspeaker 46 in conference room 30.

To avoid the limitations that are inherent in the simultaneous use of high gain in the two transmission channels, necessitated for example by line losses and the like, it is customary to employ voice switching to eliminate talker echo and singing. Typically, the gain of each of the two channels is continuously changed in accordance with the direction of the stronger speech signal. The interchange of gain between the receive and transmit channels is effected by control circuits operating on a linear differential basis. Simply, the channel having the stronger signal is given the higher gain. The objectionable effects of the gain changes are reduced by employing smoothly operating variolosser elements or the like.

FIG. 2 shows a conference telephone system equipped both with voice switching and automatic noise equalization apparatus of the present invention. Voice switching is accomplished by means of variolossers 100 and 101 in the outgoing and incoming circuits, respectively, of the West station, and variolossers 102 and 103 in the outgoing and incoming circuits, respectively, of the East station. The control circuits for actuating the transmit and receive variolossers at each station are indicated only by means of dashed lines since these circuits may be identical to one described in the aforementioned Bell System Technical Journal article. The noise equalizing system of the present invention is thus adapted to cooperate with such a voice switched circuit.

With variolossers 100 and 102 in the transmit circuits of the West and East stations, the noise signal from the East station, for example, will reach point $P_2$ at the West station only when a conferee at the East station is talking. It will not reach point $P_2$ when a conferee at the West station is talking. Thus, the noise level at the West station rises and falls in synchronism with the talk spurts at the East station. In addition, any line loss in channel 11, represented by resistor 116 in the drawing, will reduce the level of the noise signal reaching point $P_2$ from the East station. Such a reduction will be indistinguishable from an actual lowering of the noise level at the East station. The auxiliary noise equalizing circuit of the present invention assures noise parity at the two stations in the presence of either or both of the above sources of attenuation. The complete equalizing circuit is shown at the West station only, and a portion of an auxiliary circuit is shown at the East station. In practice, the two terminal stations are equipped with a complete circuit as illustrated here, for simplicity, in the two stations together.

The loss of variolosser 102 at the East station is selectively circumvented by means of Nogad 104, which responds to the noise in signals from microphone 33 at the East station, and correspondingly reduces the attenuation of variolosser 106. This increases the level of a single frequency signal developed in oscillator 107 which is added to the outgoing signal at the point $P_4$. The frequency of the signal of oscillator 107 is selected to be outside the voice frequency band and preferably is selected to be below the band. On reaching point $P_2$ at the West station, this signal passes through bandpass filter 108, is detected in rectifier 109, and is combined with the output of Nogad 110 to produce a D-C control voltage at the output of difference circuit 111. If this control voltage is positive, which it will be if the noise level at the East station is higher than at the West station (assuming negligible line loss), the output of difference network 111 removes attenuation from variolosser 112 in proportion to the difference so that the output of noise generator 113 may reach loudspeaker 26 accordingly. As before, noise signals from noise generator 113 are suitably equalized in 114 before passing through tandemly connected variolossers 115 and 112, and auxiliary equalizer 125.

If line loss is present, however, the signal at $P_2$ from the tone signal developed by oscillator 107 is attenuated and the noise output of loudspeaker 26 is lower than in the previous discussion. To curb such a loss, if there is one, a second oscillator 117 at the East station is employed. It's signal is also added to the outgoing signal of the East station. The frequency of this signal is sufficiently different from the frequency of the signal developed by oscillator 107 to be separable from the latter by simply filtering. (Yet, it is close enough in frequency to that of oscillator 107 to undergo essentially the same attenuation during transmission.) When the tone signal from oscillator 117 reaches point $P_2$ at the West station, it is selected by bandpass filter 118, detected by rectifier 119 and delivered to differential network 120. The resulting rectified signal is compared with the rectified output of oscillator 121, which is supplied to differential network circuit 120 by way of rectifier 122. If the level of the signal from oscillator 117 is lower than that of the signal from oscillator 121, the output of differential network 120 is positive. This causes direct current to flow to variolosser 115 to remove attenuation equal to the loss encountered in transmission circuit 11.

The net result, therefore, is to produce a noise level in loudspeaker 26 at the West station equal to the noise level at the East station, independent of the presence or absence of either switching losses or line losses. The generated noise level is also independent of the talking level at either location since the Nogad monitoring devices respond only to the long time-average level of noise. In the arrangement shown, voice frequency bandpass filter 123 at the West station (and 124 at the East station) prevents the control frequencies from becoming audible via the speech signal loudspeakers 12 and 32.

The above-described arrangements are merely illustrative of the application of the principles of the invention. Numerous other arrangements may be devised by those skilled in the art without departing from the spirit and scope of the invention. For example, a single Nogad network may be employed at each station in the arrangement of FIG. 2 both for supplying signals to the differential network, e.g., 111 at the West station and to the West station variolosser corresponding to variolosser 106 at the East station. Other circuit economies may similarly be made.

What is claimed is:

1. In combination, a two-way telephone circuit connecting terminal stations each of which includes a transmitting circuit supplied with microphone signals and a receiving circuit supplying signals to a loudspeaker system, means at each of said terminal stations for controlling the noise level in the vicinity of the microphone system at that station, said controlling means including, means for continuously examining the signals in said transmitting circuit and in said receiving circuit to determine the relative levels of noise in said circuits, means responsive to said examination for developing a control signal, means for generating noise signals, and means responsive to said control signal for selectively supplying said noise signals to said loudspeaker system.

2. The combination of claim 1 wherein said means for generating noise signals comprises, a thermal noise generator, and equalizer means for selectively shaping the spectrum of noise signals produced by said generator to one that approximates that of ambient noise in the vicinity of the microphone system at the associated station.

3. In combination, a two-way telephone circuit connecting terminal stations each of which includes a transmitting circuit supplied with microphone signals and a receiving circuit supplying signals to a loudspeaker system, means at each of said terminal stations for continuously adjusting the noise level in the vicinity of the microphone system at each station to establish substantially equal and relatively constant levels of noise at all stations, said adjusting means including, means for differentially responding to noise signals in said transmitting and said receiving circuits to develop a control signal, means for generating noise signals, an auxiliary loudspeaker system, and means responsive to said control signal for selectively supplying said noise signals to said auxiliary loudspeaker system.

4. In combination with a two-way conference telephone system comprising a two-way telephone circuit connecting terminal stations each of which includes a transmitting circuit supplied with microphone signals and a receiving circuit supplying signals to a loudspeaker, means for substantially equalizing the noise levels at each of said terminal stations, which comprises, at each station, means for differentially responding to the noise level in said transmitting and said receiving circuits to develop a control signal, means for generating noise signals, an auxiliary loudspeaker, and means responsive to said control signal for selectively supplying said noise signals to said auxiliary loudspeaker.

5. A two-way conference telephone system which comprises, a plurality of conference stations each of which includes a microphone system for developing outgoing signals and a loudspeaker system for reproducing incoming signals, a two-way communication circuit for transmitting outgoing signals generated at each station to the other stations and for receiving incoming signals from the other stations, means for continuously adjusting the noise level at the quieter stations to match the noise level at the noisiest location thereby to create comparable environments, said means comprising at each station, first noise responsive signal generating means supplied with outgoing signals, second noise responsive signal generating means supplied with incoming signals, differential network means supplied with signals from said first and said second noise responsive means for producing a control signal proportional to the difference in the level of noise signals in said outgoing and said incoming signals, means for generating random noise signals, means for selectively shaping the spectrum of said random noise signals, and means responsive to said control signal for selectively supplying said shaped noise signals to said loudspeaker system.

6. A two-way conference telephone system as defined in claim 5, which includes means for selectively supplying said shaped noise signals to said first noise responsive signal generating means to compensate for noise signals in said incoming signals transferred to said outgoing signals by way of said loudspeaker and said microphone systems.

7. In combination, a two-way telephone circuit connecting remotely situated terminal stations each of which includes a transmitting circuit supplied with microphone signals, a receiving circuit supplying signals to a loudspeaker system, and a speech signal responsive control network, means at each of said terminal stations for controlling the noise level in the vicinity of the microphone system in that station, said controlling means including, means for continuously determining the level of noise in said transmitting circuit, means for developing a first tone signal, means for adding said first tone signal to said microphone signals in proportion to the level of noise in said transmitting circuit, means for determining the level of said first tone signal in said receiving circuit, means responsive both to said determined level of first tone signal in said receiving circuit and to said determined level of noise in said transmitting circuit for developing a control signal, means for generating noise signals, and means responsive to said control signal for selectively supplying said noise signals to said loudspeaker system.

8. The combination of claim 7 in further combination with means at each terminal station for developing a second tone signal, means for adding said second tone signal at a fixed level to said microphone signals, means for determining the level of said second tone signal which originates at another terminal station and which appears in said receiving circuit, means for developing a third tone signal of a fixed level, and means responsive to the relative levels of said received second tone signal and said third tone signal for adjusting the level of said generated noise signals.

9. A two-way conference telephone system which comprises, a plurality of conference stations each of which includes a microphone system for developing outgoing signals, a loudspeaker system for reproducing incoming signals, and voice switched gain adjusting apparatus, a two-way communication circuit for transmitting outgoing signals generated at each station to the other stations and for receiving incoming signals from the other stations, means for continuously adjusting the noise level at the quieter stations to match the noise level at the noisiest location thereby to create comparable environments, said means comprising at each station, noise responsive means for developing a signal representation of the level of noise in said outgoing signals, means for generating tone signals at a first frequency, means responsive to said noise level signal representation for selectively adding said first tone signal to said outgoing signals, means for generating tone signals at a second frequency, means for adding said second tone signals to said outgoing signals at a fixed level, means supplied with incoming signals for developing a first control signal proportional to the level of tone signals received from another station at said first frequency, means supplied with incoming signals for developing a second control signal proportional to the level of tone signals received from another station at said second frequency, means for generating random noise signals, means responsive to said signal representation of the level of noise in said outgoing signals and to said first control signal for selectively supplying said noise signals to said loudspeaker system, means for generating a third tone signal at a fixed level, and means responsive to said second control signal and to the fixed level of said third tone signal for adjusting the level of said noise signals being supplied to said loudspeaker system.

10. A two-way conference telephone system as defined in claim 9 wherein said loudspeaker system at each conference station includes loudspeaker means supplied solely with speech frequency signals in said incoming signals, and loudspeaker means supplied solely with said adjusted noise signals.

References Cited

UNITED STATES PATENTS

| | | | |
|---|---|---|---|
| 2,267,622 | 12/1941 | Mitchell. | |
| 2,885,493 | 5/1959 | Felder | 179—170.8 |
| 3,133,990 | 5/1964 | Seeley | 179—1.8 |

KATHLEEN, H. CLAFFY, *Primary Examiner.*

R. P. TAYLOR, *Assistant Examiner.*